June 20, 1967 E. I. SHOBERT II 3,327,147
IMPACT-REDUCING BRUSH HOLDER
Filed Dec. 16, 1964

INVENTOR.
EARLE I. SHOBERT II
BY
Brown, Critchlow, Flick & Peckham.
ATTORNEYS.

3,327,147
IMPACT-REDUCING BRUSH HOLDER
Erle I. Shobert II, St. Marys, Pa., assignor to Stackpole Carbon Company, St. Marys, Pa., a corporation of Pennsylvania
Filed Dec. 16, 1964, Ser. No. 418,669
2 Claims. (Cl. 310—242)

This invention relates to electrical machines having rotating current collectors engaged by brushes, and more particularly to such machines that are subject to heavy impacts or extreme vibration.

When a rotating electrical machine, such as a motor or generator, receives a heavy impact, sparking usually can be seen between the brushes and the commutator or slip ring due to the force of the impact causing the brushes to bounce off the current collector. Increased spring pressure on the brushes will reduce the distance they can separate from the collector under any given impact, but separation and sparking still occur if the impact is large enough. The effect is most apparent on machines with radial brushes, since there is no force other than the spring-pressed arm to hold the brushes on the current collector. The electrical machines where bouncing of the brushes under heavy impact is most likely to occur are motors for heavy power tools, and motors and generators for diesel-electric locomotives.

It is among the objects of this invention to provide a rotary electrical machine, in which separation of the brushes from the current collector will be reduced materially or eliminated entirely, and in which this is done in a simple and inexpensive manner.

In accordance with this invention, a brush holder is provided with a passage through it having its inner end adjacent an electrical machine's rotating current collector, such as a commutator or a slip ring. A brush is slidably disposed in the passage in engagement with the current collector. The brush is held firmly against the collector by a spring-pressed arm having one side continually engaging the outer end of the brush with a predetermined pressure. Disposed in line with the brush is a weight that normally engages the opposite side of the arm but is movable away from it. The weight weighs enough more than the brush so that when an impact against the machine is transmitted through the collector to the inner end of the brush the weight will be knocked away from the arm without separating the brush from the collector appreciably. The weight is urged toward the arm by resilient means with a pressure that is materially less than the pressure of the arm against the brush, so that the arm will continue to exert substantially the same predetermined pressure against the brush even when the weight is knocked away from the arm.

Figure 1:
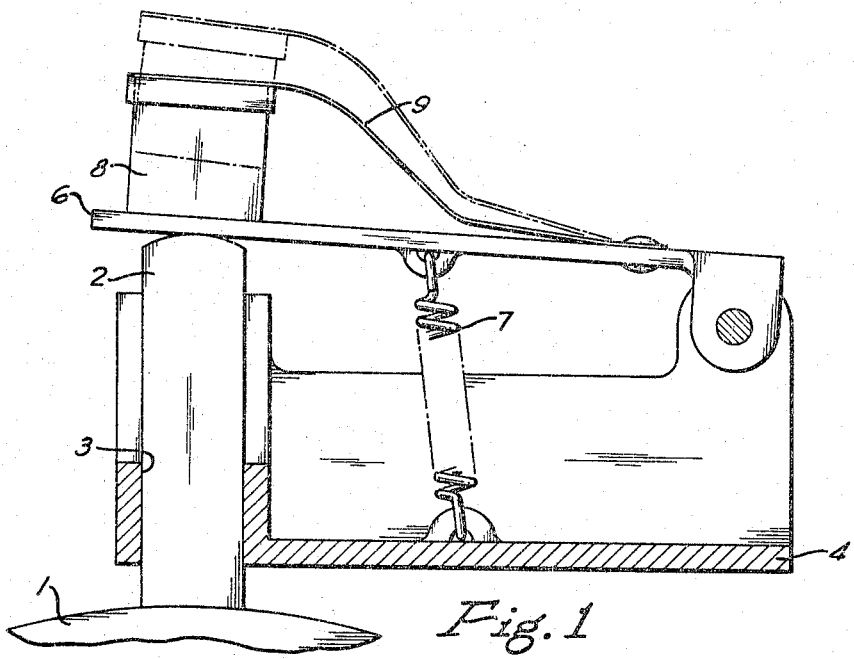
Figure 2:
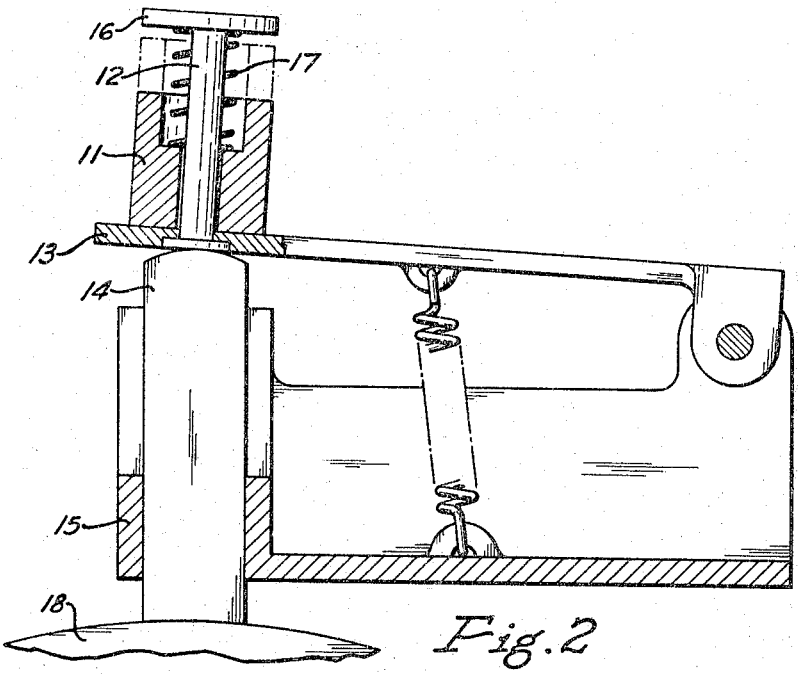

The preferred embodiment of the invention is illustrated in the accompanying drawings, in which
FIG. 1 is a longitudinal section of a brush holder, showing the brush and pressure arm in elevation; and
FIG. 2 is a similar view of a modification.

Referring to FIG. 1 of the drawings, the rotatable electric current collector 1 (either a commutator or a slip ring) of an electrical machine, such as a motor or generator, is engaged by a brush 2 slidably mounted in a passage 3 in the usual brush holder 4 mounted in fixed position in any well-known manner. The brush is held against the current collector under a predetermined pressure by means of a spring-pressed arm having one side engaging the outer end of the brush. By "spring-pressed" is meant that the arm may be a stiff arm 6 pivoted at one end to the holder and pressed against the brush by means of a spring 7, or the arm itself may be resilient and anchored at one end. In either case, the arm exerts a predetermined pressure on the brush to cause it to engage the current collector with the correct amount of force for proper operation of the machine and long life of the brush.

It is a feature of this invention that in case the electrical machine or current collector receives a heavy impact, the brush will not bounce away from the collector to any appreciable extent, if at all, whereby sparking between them will be greatly reduced or avoided. Accordingly, a weight 8 is located at the side of the pressure arm 6 opposite to the brush and in line with the brush. Although the weight normally engages the arm, it is free to move away from it when the brush receives an impact from the current collector and transmits that impact through the thickness of the arm to the weight. The weight may be held in place by a light spring connected to the arm or to a separate support. A good arrangement is to connect one end of a light leaf spring 9 to the arm and the other end to the weight. When the inner end of the brush receives an impact through the current collector of sufficient force to ordinarily knock the brush away from the collector, the impact will be transmitted through the brush and arm to the weight and cause the weight to be knocked away from the arm momentarily. By making the weight at least as heavy as the brush, the weight will be knocked away from the arm without the brush separating from the collector noticeably. For best results, it is preferred that the weight be somewhat heavier than the brush.

Since it is important for good operation of the machine that the pressure of the arm against the brush remain as constant as possible, the leaf spring 9 is only strong enough to hold the weight in place against the arm. That is, the pressure of the leaf spring against the weight is materially less than the pressure of the arm against the brush. Consequently, whenever the weight is moving outwardly away from the arm because of an impact through the brush, the leaf spring will not be stiff enough to tend to lift the arm away from the brush to any appreciable extent. In case the brush is at the bottom of a current collector, the leaf spring has to be only strong enough to return the weight to engagement with the arm after it has been knocked down away from the arm. At the top of the current collector, the weight will return to the arm principally by gravity, so the leaf spring serves mainly as merely a guide or tether. In every case, the weight absorbs the impact against the brush, moves away from the arm and then immediately returns to it ready to absorb the next impact. This system materially reduces bouncing of the brush and sparking between it and the current collector. In many instances, brush bouncing may be entirely eliminated.

In the modification shown in FIG. 2, a weight 11 is slidably mounted on a post 12, one end of which is rigidly mounted in a spring-pressed arm 13 engaging the outer end of a brush 14 slidably mounted in a brush holder 15. The post extends away from the opposite side of the arm and has a head 16 at its outer end. Compressed between the post head and the weight is a light coil spring 17. When an impact against the electrical machine is transmitted through its current collector 18 to the inner end of the brush, the weight is knocked away from the arm and slides outward on the post. Then it immediately returns to the arm by gravity with the help of the coil spring, or by the force of the coil spring alone in case the brush is at the bottom of the current collector. The coil spring is so weak that its compression by the weight does not reduce the pressure of the arm against the brush to any noticeable extent, so the arm continues to press the brush toward the current collector with substantially the same force as when the weight is engaging the arm. Of course, in accordance with this invention the weight is heavy enough to prevent the brush from bouncing away from the current collector under impact. It is the weight that does the bouncing and thereby absorbs the impact.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An electrical machine having a rotating current collector, a brush holder provided with a passage therethrough having its inner end adjacent the collector, a brush slidably disposed in said passage in engagement with the current collector, and a separate spring-pressed arm having one side continually engaging the outer end of the brush with a predetermined pressure; a post rigidly mounted on said arm in line with the brush and extending away from the opposite side of the arm, a weight slidably mounted on said post and normally engaging the arm, and a coil spring compressed between the weight and outer end of the post and exerting a pressure on the weight that is materially less than said predetermined pressure, the weight weighing enough more than the brush for an impact against the inner end of the brush that knocks the weight away from the arm to have substantially no effect on the position of the brush.

2. In an electrical machine having a rotating current collector, a brush holder provided with a passage therethrough having its inner end adjacent the collector, a brush slidably disposed in said passage in engagement with the current collector, and a separate spring-pressed arm having one side continually engaging the outer end of the brush with a predetermined pressure; a weight in line with the brush normally engaging the opposite side of the arm and movable away from it, and a leaf spring having one end fastened to the weight and the other end attached to the arm, the spring holding the weight in position on the arm, the weight weighing more than the brush and being so heavy that an impact against the inner end of the brush that knocks the weight away from the arm does not separate the brush from the collector, the leaf spring exerting a pressure on the weight that is materially less than said predetermined pressure.

References Cited

UNITED STATES PATENTS

| 423,309 | 3/1890 | Chamberlain | 310—246 |
| 426,471 | 4/1890 | Rice | 310—246 |
| 990,461 | 4/1911 | Smith et al. | 310—246 |
| 1,084,384 | 1/1914 | Allen | 310—246 |
| 1,835,788 | 12/1931 | Knoop | 310—246 |

FOREIGN PATENTS

| 18,145 | 8/1913 | Great Britain. |

MILTON O. HIRSHFIELD, *Primary Examiner.*

D. F. DUGGAN, *Assistant Examiner.*